(12) United States Patent
Schäfer

(10) Patent No.: US 8,827,619 B2
(45) Date of Patent: Sep. 9, 2014

(54) RACK WAREHOUSE AND ORDER-PICKING METHOD

(75) Inventor: Gerhard Schäfer, Neunkirchen (DE)

(73) Assignee: SSI Schafer Noell GmbH Lager—und Systemtechnik, Giebelstadt (DE)

(*) Notice: Subject to any disclaimer, the term of this patent is extended or adjusted under 35 U.S.C. 154(b) by 236 days.

(21) Appl. No.: 12/275,582

(22) Filed: Nov. 21, 2008

(65) Prior Publication Data

US 2009/0129902 A1    May 21, 2009

Related U.S. Application Data

(63) Continuation of application No. PCT/EP2007/004536, filed on May 23, 2007.

(30) Foreign Application Priority Data

May 24, 2006  (DE) .......................... 10 2006 025 620

(51) Int. Cl.
*B65G 1/04*    (2006.01)

(52) U.S. Cl.
USPC ........................................... 414/268; 414/277

(58) Field of Classification Search
CPC ... B65G 1/0414; B65G 1/0428; B65G 1/0435
USPC ................................ 414/266–268, 277, 280
See application file for complete search history.

(56) References Cited

U.S. PATENT DOCUMENTS 3,379,321 A * 4/1968 Weir ............................. 414/281
5,135,344 A * 8/1992 Kita et al. ...................... 414/273

(Continued)

FOREIGN PATENT DOCUMENTS

| DE | 40 21 665 A1 | 1/1992 |
| DE | 101 05 706 A1 | 9/2002 |
| EP | 0 847 939 A1 | 6/1998 |
| EP | 1 452 462 A2 | 9/2004 |

(Continued)

*Primary Examiner* — Jonathan Snelting
(74) *Attorney, Agent, or Firm* — McNeely, Hare & War LLP; Kevin J. McNeely, Esq.

(57) ABSTRACT

It is disclosed a order-picking method and a rack warehouse (10; 100; 200; 308) for order-picking goods stored in load supports (52), particularly on trays, comprising: at least one rack (20; 30) having first and second longitudinal sides (24, 25) and two front faces (22, 23), wherein the rack has at least one rack plane (40-44), wherein each rack plane (40-44) comprises a plurality of rack rows (46), wherein the rack rows (46) are arranged on top of each other and respectively comprise a plurality of rack positions (48) arranged side-by-side; at least one rack feeder (33) for each rack plane (40-44) comprising at least one load suspension device for the purpose of storing and retrieving load supports (52) into or from the rack positions (48) of a rack plane (40-44), wherein the rack feeder can travel in horizontal and vertical directions (37, 35) along the first longitudinal side (25) of the rack (20, 30), in order to store and retrieve load supports (52) in or from its rack plane (40-44); and several vertical lift units (26), which are arranged at the second longitudinal side (24) of the rack (10) and comprise a load suspension device for retrieving and delivering load supports (52) from or to transfer rack storage positions (50). Particularly, at least one work station (28) is provided, wherein a work station (28) is assigned to each lift unit (26), wherein each work station (28) comprises a device (58) for presenting a load support.

21 Claims, 8 Drawing Sheets

(56) References Cited

U.S. PATENT DOCUMENTS

| | | | |
|---|---|---|---|
| 6,602,037 B2 * | 8/2003 | Winkler | 414/273 |
| 2004/0253082 A1 * | 12/2004 | Mathys et al. | 414/280 |
| 2005/0008463 A1 | 1/2005 | Stehr et al. | |
| 2006/0216138 A1 * | 9/2006 | Schaefer | 414/266 |

FOREIGN PATENT DOCUMENTS

| | | |
|---|---|---|
| WO | WO 99/10258 A1 | 3/1999 |
| WO | WO 03/010074 A | 2/2003 |
| WO | WO03/024845 A | 3/2003 |
| WO | WO 2005068327 A1 * | 7/2005 |

* cited by examiner

RACK WAREHOUSE AND ORDER-PICKING METHOD

RELATED APPLICATIONS

This is a continuation application of co-pending international patent application PCT/EP2007/004536 filed on May 23, 2007 which claims priority of the German patent application DE 10 2006 025 620 filed on May 24, 2006 which is fully incorporated by reference herewith.

BACKGROUND OF THE INVENTION

The present invention relates to a rack warehouse for order picking goods or articles stored in load supports, and relates particularly to an order-picking system having such a rack warehouse.

The present invention further relates to an order-picking method for order picking a plurality of different types of goods or articles which are stored in or on load supports, particularly trays, wherein the order-picking process is carried out in accordance with an order-picking order.

RELATED PRIOR ART

Due to constantly growing assortments of goods and constantly abridged time windows within which goods have to be delivered, for example, from a central warehouse to branches, logistic problems of enterprises are constantly becoming bigger. Exemplarily, it is referred to huge retail enterprises, such as general stores, direct shippers, or food retailers. Expert groups usually use the term "retail" in this context. "Retail" particularly is to be understood as retailing, but also as retail trading, small retailing or retail shopping, such as the one of an assortment book seller.

In this context, it is a basic requirement to either hold as much as possible goods centrally on stock, preferably also for long periods of times, or to maintain a trans-shipment center which is sufficiently huge enough ("cross docking"). Goods held on stock have to be arranged as fast as possible and sent to the orderer, as soon as the order-picking order comes in. An order-picking order hereinafter is to be understood as an arrangement of a plurality of different types and numbers of goods.

In the prior art huge central warehouses or decentralized stores are proposed which are geographically located as optimal (i.e. central) as possible, in order to allow delivery of goods to as much as possible associated branches. For reducing delivery times, the prior art suggests different order-picking systems and order-picking methods while the number of different types of goods within the central warehouse is permanently increased.

The document WO 03/010074 A1 proposes a method and system for serving a rack within an order-picking system. The system comprises a rack and an associated rack feeder (rack serving device) for storing and retrieving containers, trays and the like from the rack or into the rack. There, a rack consists of several rack areas being arranged on top of each other, respectively having a plurality of rack planes. Each rack area has assigned a rack feeder, adjustable in height and length, the rack feeder being mechanically coupled to the rack area. At a front face of the rack a buffer zone for each rack area having same level is provided, in order to deliver containers. The buffer zone is always located on the same level relative to the rack area. Further, at least one vertically movable lift is provided at the front face of the rack retrieving the containers from the buffer zones and delivering the same to a conveyor technique, which in most cases is arranged on the ground, for the purpose of further order picking.

With this approach a problem exists in that the entire stream of goods for storing and delivering containers from the rack happens via the vertical lift arranged at the front face so that the throughput is relatively low, particularly in times when a lot of containers have to be delivered and simultaneously, and/or additionally, stored. Lifts at the front face represent a "bottle neck".

According to another prior art approach, which is also known under the term "tunnel picking", articles to be picked are stored, for example, on Europool pallets into the racks. The storing particularly happens through a rack feeder movable along a longitudinal side of the rack over the entire height and length thereof. In this connection, the rack typically has several planes. The space between two planes is called an aisle. In the center of the aisle, for example, an order-picking conveyor belt is arranged. Articles to be picked are fetched from the rack by an operator (order picker) and put on the central belt. The central belt transports articles to be picked to a packing station and subsequently to a shipping station.

A drawback of this concept is that warehouses relatively large in space are required for providing racks which allow storage of completely loaded Europool pallets. Further, each rack plane requires its own conveyor technique (central belt) in order to allow transportation of the goods to the packing station and shipping station, respectively. An order-picking process here happens in two stages, i.e. within the tunnel and at a remotely located packing station. Articles are picked in the tunnel and then distributed to the corresponding stations. Tunnel picking requires a lot of personnel. Under certain circumstances, order pickers have to cover very long paths within the aisle—due to the "man-to-good" principle—for arriving at the good. The entire system is unevenly used to capacity. Sorting is inevitable when the tunnel is left. The length of the tunnel warehouse is restricted to 35 meter due to safety reasons (emergency exits), resulting in a small number of storing positions. Path-optimized order-picking process ("goods-to-man") is almost impossible. Sequencing is extremely complex.

SUMMARY OF THE INVENTION

In the light of this situation, it is an object to provide an order-picking warehouse as well as a corresponding method by which the efficiency is increased and the space required for the warehouse can be minimized.

According to an aspect of the present invention, a rack warehouse is proposed for order-picking goods or articles stored in load supports, particularly on trays, wherein the rack warehouse comprises: at least one rack having first and second longitudinal sides and two front faces, wherein the rack comprises at least one rack plane, wherein each rack plane has a plurality of rack rows, wherein the rack rows are arranged on top of each other and respectively include a plurality of rack positions arranged side-by-side; at least one rack feeder for each rack plane which has at least one load suspension device for storing and retrieving load supports into the rack positions and from rack positions of a rack plane, wherein the rack feeder is movable in horizontal and vertical directions along the first longitudinal side of the rack for storing and retrieving load supports in its rack plane; and several vertical lift units arranged on the second longitudinal side of the rack and which have a load suspension device for retrieving and delivering load supports from and to predetermined rack warehouse positions.

Preferably, the rack warehouse further comprises at least one work station, wherein a lift unit is assigned to each work station, wherein each work station particularly comprises a device for presenting load supports.

Shifting the vertical lifts from the front face to the longitudinal side of the rack results in a plurality of advantages, particularly if several lift units are arranged laterally.

On the one hand, several vertical lift units can be arranged side-by-side resulting in an increased number of possible exchange cycles between lift units and the rack. In the prior art, merely one single lift could be provided at the front face since a rack feeder being movable within the aisle always had one single delivery point only, i.e. the end of the aisle at the front face. According to the present invention, the transfer from the rack feeder to the lift unit, and vice versa, is decoupled. Load supports which are required by the vertical lift are "temporarily stored" in predetermined rack positions, i.e. the so-called transfer rack positions, in accordance with the present invention. The rack feeder travels along the longitudinal side, and thus can supply several lift units, which are arranged at the opposite longitudinal side of the rack, with load supports. An additional conveyor technique in the region of transfer between the rack feeder and the lift, as required in the prior art, is not necessary. If the rack feeder particularly comprises several load suspension devices, which preferably are arranged on top of each other and/or side-by-side in a lying manner, the lateral lift units can be supplied with several load supports simultaneously. Then, the lift unit transports the "temporarily stored" load supports substantially in the vertical direction towards a work station assigned thereto, or to a conveyor loop which can be arranged on top of the rack warehouse. This concept allows greater dynamic in comparison with prior art according to which the vertical lifts were arranged at the front faces.

The lift units can access several transfer positions within the rack. This allows sequenced provision of load supports at the work station as it will be described below in more detail.

Further, lateral lift units allow, during load supports are stored into the rack, decoupling of a process of storing goods from a process of retrieving goods, while load supports are retrieved from the rack in order to be picked, for example.

In accordance with a preferred embodiment, first and second lifts are provided, wherein transfer rack positions assigned to the first lift and wherein the first lift is adapted to retrieve load supports from the shelf and transport the same to the work station and wherein the transfer rack positions are assigned to the second lift and the second lift is adapted to deliver load supports to the rack.

In this manner, the process of storing goods can be decoupled from the process of retrieving goods. For the storing and retrieving of goods, separate lifts are provided, respectively, wherein the lift has no other function.

Further, it is advantageous if the second lift is coupled to a goods receipt conveyor.

The goods receipt conveyor serves for supplying the rack warehouse with load supports and goods, respectively, which are retrieved from the rack warehouse during order-picking processes.

Preferably, the vertical lift unit comprises several load suspension devices, each of which is vertically movable, in a pairwise manner along a frame, and allows to receive and/or deliver load supports independently from each other.

This measure increases the throughput of load supports since several load supports can be handled simultaneously.

Even further, it is advantageous if the lift unit supplies the work station with load supports laterally.

Lateral supply of the work station ensures an ergonomic provision of load supports. An operator can push off articles in an easy manner, the articles being located in or on the load supports.

Preferably, a tilting device is provided which tilts the load support towards a direction where the operator pushes the goods for the further processing. The load supports do not need to be lifted, which ergonomically is advantageous as well. Further, preferably rollers or similar devices are provided which support a rehandling movement.

In accordance with another preferred embodiment, the work station is coupled to a goods issue conveyor.

The goods issue conveyor allows the transport of the load support to be picked (goods) as such to the packing station at which the articles and goods, respectively, are picked and packed.

The work station particularly comprises a rehandling unit, wherein the rehandling unit rehandles goods, which are contained on or in a load support being presented, or load supports for further processing.

If the goods to be picked are transported directly, i.e. without load supports, a conveyor technique for empty load supports can be saved. In a similar manner how the load supports get to the work station, the load supports can be transported off therefrom on an inversed way as well. For that purpose, preferably the lift units and the rack feeders are used. This results in lower costs, since less or no conveyor is required.

Particularly, the re-handling unit is an operator or a rehandling machine.

The presently proposed system allows manual as well as mechanical operation.

In accordance with another embodiment, the device for presenting the load supports comprises an area onto which, or from which, the load support can be retrieved from, or delivered to, the lift unit, wherein the area for presenting is coupled to means for tilting the area.

The means for tilting the area, in turn, increase the ergonomics at the work station, particularly if humans are used for rehandling order-picking goods from the load supports onto, for example, a conveyor technique or directly onto a shipping pallet.

Particularly, the work station comprises a frame of the rack type, wherein the frame comprises additional rack positions being arranged on top of each other for storing particularly load supports dedicated to fast movers, wherein these additional rack positions are arranged above and/or beneath the device for presenting the load supports, which can be integrated into the frame, such that the lift unit assigned to the work station can, for example, retrieve the fast movers from there and deliver the same thereto.

This measure, in turn, increases the throughput. The space above the device for presenting the load supports can be used as additional storage space. Thus, it serves as a buffer and/or store. This store is preferably kept free for so-called "A" articles. An "A" article is to be understood as an article which is required very often and in high piece numbers with a plurality of order-picking orders. By storing them within direct proximity to the work station or to the lift unit a fast provision is ensured. The paths, which such "A" articles have to cover, are extremely short which, in turn, shortens the time necessary for providing these articles.

In accordance with another embodiment, a first rack and a second rack are provided which are arranged oppositely along the first longitudinal side, form a rack unit and define a respective rack aisle between each other, in which the rack feeder of each rack plane can travel.

Here, the modularity of the system of the present invention is expressed. Several racks can be combined with each other for generating larger rack warehouses. A rack feeder can supply simultaneously two racks, i.e. the racks are arranged adjacent thereto. Thereby, the number of storing positions is increased. The rack feeder takes care of the transport of load supports from two rack planes arranged horizontally in an opposite manner by traveling within the opposing rack planes horizontally as well as vertically.

Furthermore, it is advantageous, if the lift units are respectively arranged at exterior longitudinal sides of the rack unit.

If the lift unit is arranged at an exterior longitudinal side, it cannot collide with the rack feeder being arranged on the opposite side. This opposite side forms the central, i.e. inner, rack aisle, if the rack unit consists of two racks. A separate connection of conveyors for the goods receipt and the goods issue, in this manner, becomes possible.

According to another preferred embodiment, each work station in the region of the device for presenting the load supports is provided with a sensor, particularly a light grid, for detecting an exchange of load supports between the lift unit and the work station, and/or for detecting the picking of goods or a load support.

The light grid has two functions, i.e. the monitoring of safety as well as the monitoring of the order-picking process as such. By means of the light grid one can detect, whether an order picker has, for example, his/her arms or hands within the region of the load support, in order to prevent transfer of the load support which might result in an injury of the operator. Further, it can be monitored, whether the operator has picked the load support as such, or the goods therefrom in accordance with the order-picking order. Thereby, an order-picking error rate is reduced.

Particularly, it is advantageous, if the load support is a tray on which goods of only one sort are stored in terms of complete pallet layers.

Particularly, with the order picking for food retail chains, it has been detected that different types of articles mostly are requested in greater figures for each order-picking order. The requested types of goods are typically delivered by one sort only, for example on Europool pallets, to the order-picking warehouse. These Europool pallets are layerwisely cleared or depalletized, wherein each pallet layer is rehandled onto an individual tray. Singularization of the layers for getting individual articles or good units is not performed. This measure reduces the number of trays which are required for disbanding an entire pallet. Thus, the space is reduced which is required for disbanding a pallet, since with an individual disbandment more space is needed within the rack due to the higher number of required trays, in order to accommodate the same volume of goods.

The layerwise disbandment of the pallets is advantageous in that the pallets do not have to be entirely disbanded immediately, but can be guided back into a pallet warehouse after a layer has been picked. Thereby, the number of pallets to be kept on stock within the pallet warehouse is reduced since the transfer of goods from the pallet warehouse into the rack warehouse happens in a "layerwise" manner and complete pallets are not singularized (disbanded) as done in the prior art.

According to another embodiment, the load suspension device of the rack feeder can receive up to four load supports simultaneously and independently from each other, and the load suspension device of the lift can receive several load supports on top of each other and drive the same independently from each other.

This measure also increases the throughput, and the time is shortened which is required for storing or retrieving load supports.

Further, it is advantageous, if the first transfer rack positions are rack positions which are supplied by the rack feeder with load supports during an order-picking process from the first longitudinal side of the rack, and which are emptied from the second longitudinal side of the rack by the lift, and which are supplied during a storing process over the second longitudinal side and emptied from the first longitudinal side.

Additionally, it is advantageous, if each rack plane has up to eight rack rows.

The above-mentioned object is also achieved by an order-picking system having a rack warehouse in accordance of the above-explained type, wherein the order-picking system further comprises: a high-bay warehouse for storing pallets being loaded in an layerwise manner; a depalletizing device for depalletizing the pallets of the high-bay warehouse; at least one packing station; and a shipping station.

The rack warehouse in accordance with the present invention can be integrated into almost each order-picking system as a module. Particularly, it is used in combination with a high-bay warehouse which stores pallets being loaded in a layerwise manner, which are also depalletized onto trays in a layerwise manner, in order to store trays, which are loaded in that manner, within the rack warehouse.

Further, it is advantageous, if a fast mover storage area is provided, and if, particularly, a warehouse for remaining goods is provided.

Both, the storage area for fast-moving items and the warehouse for the remaining goods are additional modules which can be combined with a rack warehouse according to the present invention for forming an order-picking system, which can match a plurality of order-picking requirements.

Particularly, the different components of the order-picking system are respectively coupled to each other by means of a conveyor technique. The conveyor technique transports the corresponding transport units to and from the modules. The transport units can either be loaded or empty pallets, loaded or empty load supports, and similar.

In accordance with another embodiment, the packing station is integrated into the work station of the rack warehouse.

In this manner, at least one conveyor technique for the transport of the goods or load supports to the packing station is saved. Further, the throughput of the entire system is increased, again, since the goods to be picked do not have to be transported to a separate packing station any more.

The above-mentioned object is further achieved by an order-picking method for order-picking a plurality of different types of goods, which are stored on or in load supports, particularly trays, in accordance with an order-picking order, the method having the following steps: dividing a rack of a rack warehouse into at least one rack plane respectively having a plurality of rack rows being arranged on top of each other and respectively having a plurality of rack positions being arranged side-by-side, and including a rack feeder movable vertically and horizontally; assigning to each type of good at least one rack position and storing of at least all types of goods, which are needed for processing the order-picking order, into the assigned rack positions; and processing the order-picking order; wherein the step of processing comprises the following steps: controlling a rack feeder such that the rack feeder retrieves a load support containing a type of good belonging to the order-picking order from the assigned rack position, and stores it into a transfer rack position; controlling a vertical lift unit arranged laterally with respect to the rack such that the lift unit retrieves the load support from the transfer rack position and delivers the same to a work station such as a device for presenting, or directly onto a conveyor; and rehandling goods from the load support, or load supports for transportation to a packing station.

The substantial advantages of this method are to be seen in the decoupling of the rack feeder during the handover of the load supports to the lift unit as well as in the sequenced provision of load supports to the work station, and the faster storing and retrieving of load supports. Further, the storing of load supports into the rack can be decoupled from the retrieving of load supports from the rack by providing several lateral lift units.

If the work station is served by several lift units simultaneously, the throughput can be increased.

Additionally, the lifts of the lift units respectively can have several (e.g. 4) load suspension devices for retrieving and handing over load supports. In this manner, a performance increase can be achieved, for example, by "4-times cycles". Preferably, the rack feeder comprises at least the same number of load suspension devices. A "4-times cycle" is to be understood as the simultaneous transfer of four load supports, for example, between the lift and the transfer positions, or between the rack feeder and the transfer positions.

If the packing station is directly integrated into the work station, combinations of goods (such as twelve packages of milk) can be rehandled directly from the lift onto the pallet to be order picked. While a first lift, for example, transports away a tray again, the second lift, which is assigned to the identical work station, can transport a new load support to the work station.

In accordance with a preferred embodiment, another lift unit arranged laterally hands over a load support to storing transfer rack positions, whereupon the rack feeder retrieves this load support from the storing transfer rack position, and either stores it into a rack position or into a transfer rack position.

This aspect of the invention again reflects the decoupling of the rack feeder and the lift. The rack feeder does not need to wait for the lift when handing over a load support, but hands over the load support to a transfer position. While the rack feeder delivers load supports to the transfer rack positions for order-picking purposes, it can simultaneously retrieve load supports from storing transfer rack positions, i.e. during the same horizontal travel into the rack aisle, in order to store this retrieved load support in a rack position. Both of these processes represent two sequencing stages. A first sequencing stage is reflected in the location at which the rack feeder stores the load support. The farther away a storing position is located from a transfer rack position, the longer the way is and it will take to retrieve the corresponding load support for order-picking purposes. A second sequencing stage is reflected by the storing lift. By means of the storing lift the time point can be controlled at which the load support is stored, or provided to the rack feeder for retrieval.

Preferably, the lift retrieves a load support dedicated to a fast mover from a transfer rack position during storage, and delivers this load support dedicated to a fast mover to an additional rack position which is provided above and/or beneath the work station.

Thereby, the ways are shortened in order to transport fast movers to the work station. Only for the transport purpose the lift is needed, but the rack feeder is not used. This results in a faster provision of fast-moving items, fast movers or "A" article.

Particularly, the delivery or retrieval of a load support to or from the work station is detected by a sensor unit in order to avoid that a load support transfer between the work station and the lift occurs during an operator works in the transfer area, and/or in order to detect the picking of goods from the load supports.

On the one hand, this increases the operational safety, and on the other hand the order-picking safety is increased. The operator is protected against physical damage. The order-picking process is monitored. The number of wrong order-picking processes, particularly with regard to the number of goods to be order picked, will be reduced.

BRIEF DESCRIPTION OF THE DRAWINGS

It is clear that the above-mentioned and hereinafter still to be explained features are not only usable in the respectively described combination but also in other combinations or alone, without leaving the scope of the present invention.

Embodiments of the invention are depicted in the drawings and will be explained in more detail in the description below, wherein.

PREFERRED EMBODIMENT OF THE INVENTION

Figure 1:
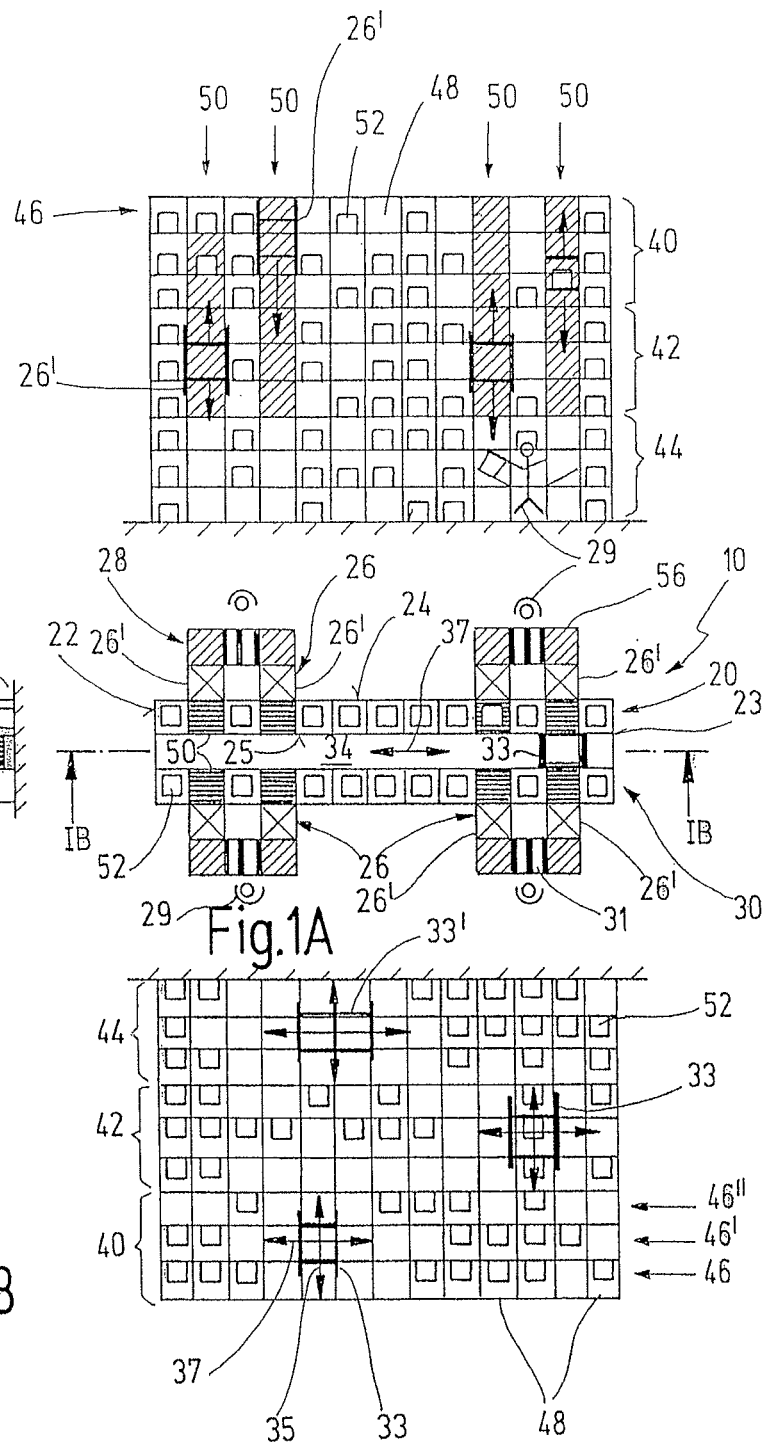
FIG. 1A-D show a top view of a rack unit (FIG. 1A), a sectional view along a rack aisle (FIG. 1B), a sectional view (FIG. 1C) of the rack of FIG. 1A, and a view of a front face (FIG. 1D) of the rack of FIG. 1A.

In the drawings, similar features will hereinafter be designated by identical reference numerals.

A load support hereinafter is to be understood as a container, tray or any other device for storing goods and articles within a warehouse. Within a container order-picking system, among other things, storage containers and order containers exist. Goods and articles, which are to be picked in accordance with an order-picking order, are stored in a storage container. An order-picking order represents kind of an order list having different articles which are to be picked. The required articles can heavily vary in number and type. Articles belonging to the order-picking order will then be picked into an order container.

In the field of food retail, the articles to be picked are typically (in a compact manner) stacked on pallets or roller containers in order to be delivered subsequently to a branch. The pallets can be the so-called Europool pallets having a dimension of 1.200 mm×600 mm, or "Düsseldorfer" pallets having a dimension of 600 mm×800 mm. With the present invention, however, arbitrary dimensions of containers, trays and pallets can be handled.

A rack feeder (RF) is understood hereinafter as a device which is movable both vertically and horizontally along a rack. For that purpose, the RF can comprise a vehicle chassis including a drive for travelling (horizontally) along a rack aisle. Further, an RF can include a mast along which a lift cart including a load suspension device (LSD) can (simultaneously) be moved in a vertical direction by means of a lifting unit. The LSD serves for receiving and/or delivering load supports such as trays. A rack aisle hereinafter is to be understood as a space between two longitudinal sides of a rack lying oppositely to each other.

FIG. 1A shows a schematic top view on a rack warehouse 10 in accordance with the present invention.

The rack warehouse 10 of the present invention comprises here two racks 20, 30. The two racks 20 and 30 form a rack unit. Each of the racks 20, 30 comprises two longitudinal sides 24, 25 and two front faces 22 and 23. Oppositely arranged longitudinal sides of the racks 20, hereinafter will be designated as first longitudinal sides. It is clear that a rack unit, among other things, can also include a double rack, which is surrounded by two single racks in a sandwichwise manner.

Along the second longitudinal side 24 of the racks 20, 30 respectively two lift units 26 are provided. It is to be noted that the lift units 26 are here arranged on the longitudinal sides, but not as it is typically done in the prior art along the front faces. Oppositely to the lift units work stations 28 are provided which are operated for example by an operator or an order picker 29, 29' or 29". The work stations 28 abut to the lift units. In FIG. 1A, four work stations 28 and four order pickers 29 are shown in total. The order picker 29 picks and packs here directly onto a pallet 31. Here, the order-picking principle "goods to man" is realized. The order picker, however, can, e.g., also pick onto a conveyor technique (here not depicted).

Between the two first longitudinal sides 25 of the racks 20 and 30 a rack aisle 34 is formed in which the RF is coupled to the rack front(s) preferably in a mechanical manner.

FIG. 1B shows a sectional view along the line IB)-IB) of FIG. 1A. In FIG. 1B one looks at the first longitudinal side 25 of the rack 30.

As can be seen in FIG. 1B, the racks are divided into a plurality of rack planes 40-44. The rack planes 40-44 are arranged vertically on top of each other. Each rack plane 40-44 can comprise a plurality of rack rows 46, 46', 46". The rack rows 46, 46' and 46" are here arranged vertically on top of each other. Each rack plane 40-44 is respectively assigned an RF 33 or 33'. The RF 33 can be moved both in a vertical direction 35 and horizontal direction 37. For that purpose, the RF 33 is mechanically coupled to at least one of the racks 20, 30, preferably it is provided with its own drive (not depicted) allowing simultaneous travel along the vertical direction 35 and the horizontal direction 37. Further, the RF 33 is provided with one or more LSD. The RF 33 shown in FIG. 1B in the rack planes 40 and 42 is respectively provided with two LSD. The RF 33' of the rack plane 44 is provided with four LSD in total since the RF 33 is two-times broad in comparison to the RF 33 of the rack planes 40 and 42.

With reference to FIG. 1C, a side elevation of the longitudinal side 24 of the rack 20 of FIG. 1A is schematically depicted.

In FIG. 1C, in turn, a plurality of rack planes 40-44 can be recognized. Each rack plane 40-44 has several rack rows 46. The rack rows 46 comprise several horizontal rack positions 48 arranged side-by-side.

Particular rack positions 48, the so-called transfer rack positions 50, exist in the racks 20, 30. In FIG. 1A, the transfer rack positions 50 are depicted hatched dark and lie oppositely to the lifts 26' of the lift unit 26. It is clear that depending on the design of the lift unit 26 and the RF 33, as far as the LSD thereof is concerned, also several transfer positions can be arranged directly side-by-side. The lift units 26 shown in FIG. 1A respectively comprise two lifts 26', which are spaced by one rack position in the longitudinal direction relative to each other. The lifts 26' are also movable in the vertical direction 35, and here have one or more LSD, which are arranged (only) on top of each other. With the assistance of the LSD the lifts 26' of the lift unit 26 can retrieve load supports 52 from the transfer rack positions 50 or deliver the same thereto. The transfer rack positions 50 are depicted, as mentioned above, hatched dark in FIG. 1A, and are not depicted in a highlighted manner in FIG. 1C for the purpose of clarity.

A work station 28 comprises an area within which, for example, an order picker 29 works, i.e. picks packaging units from a tray and delivers them to another location, and which abuts to the lift unit 26 at the work station 28, articles are either directly picked from the lift and delivered to a conveyor or packed directly onto a shipping support, or received from a device for presenting, which is part of the work station and preferably abuts directly to the lifts of the lift unit. Load supports can be exchanged between the lift unit and the presentation device. Subsequently, manual rehandling (onto a shipping support or conveyor) can occur, as explained above. It is clear that this transferring process can also occur automatically.

The order picker 29 in FIG. 1 works in an area which presently (in the top view) has the size of about 3 rack positions 48. Also, the work station comprises three rack positions, the work stations comprising the lifts 26' of the lift unit 26 and the packing station which presently lies therebetween. The lifts 26 retrieve load supports from the transfer rack positions 50 of the different rack planes 40-44 and transport a retrieved load support 52 in the vertical direction 35 up to a level on which the work station 28 is located. In FIG. 1 the work stations 28 are located on the lowermost rack plane 44. It is clear that the work stations 28 could also be arranged on an arbitrary one of the other planes 40-44. Also, several work stations could be arranged on top of each other. As soon as the lift 26' reaches the work station 28, the LSD of the lift 26' hands over the load support 52 retrieved from the transfer rack position 50 to a device for presenting (presenter) the load support, which is indicated in FIG. 1C in the right hand work station 28 by means of inclined lines in a schematic manner. The device for presenting load supports will hereinafter be described in more detail.

Additional rack positions 56, 56' or 56", are provided above the work station 28. The additional rack positions 56 are depicted hatched in FIGS. 1A and 10. The additional storage positions 56 are preferably arranged in an area oppositely to the lifts 26' as well as the transfer rack positions 50. The additional rack positions 56 preferably serve for storing so-called fast movers. A "fast mover" is to be understood as a load support in which or on which goods are stored which are very often needed with the processing of order-picking orders. These types of goods and articles, in expert groups, are also designated by the term "A" article or "fast-moving items". For providing additional rack positions 56, the work station 28 is preferably formed similarly to the racks 20 and 30, respectively, i.e. the work station comprises a frame 54 as it is depicted hereinafter in more detail in FIG. 2. The frame can be formed rackwise and have the presentation device integrated.

FIG. 1D shows a lateral view of a front face of the rack unit 10 of FIG. 1A, wherein the lateral lifts 26' are omitted for the purpose of simplification.

Figure 2:
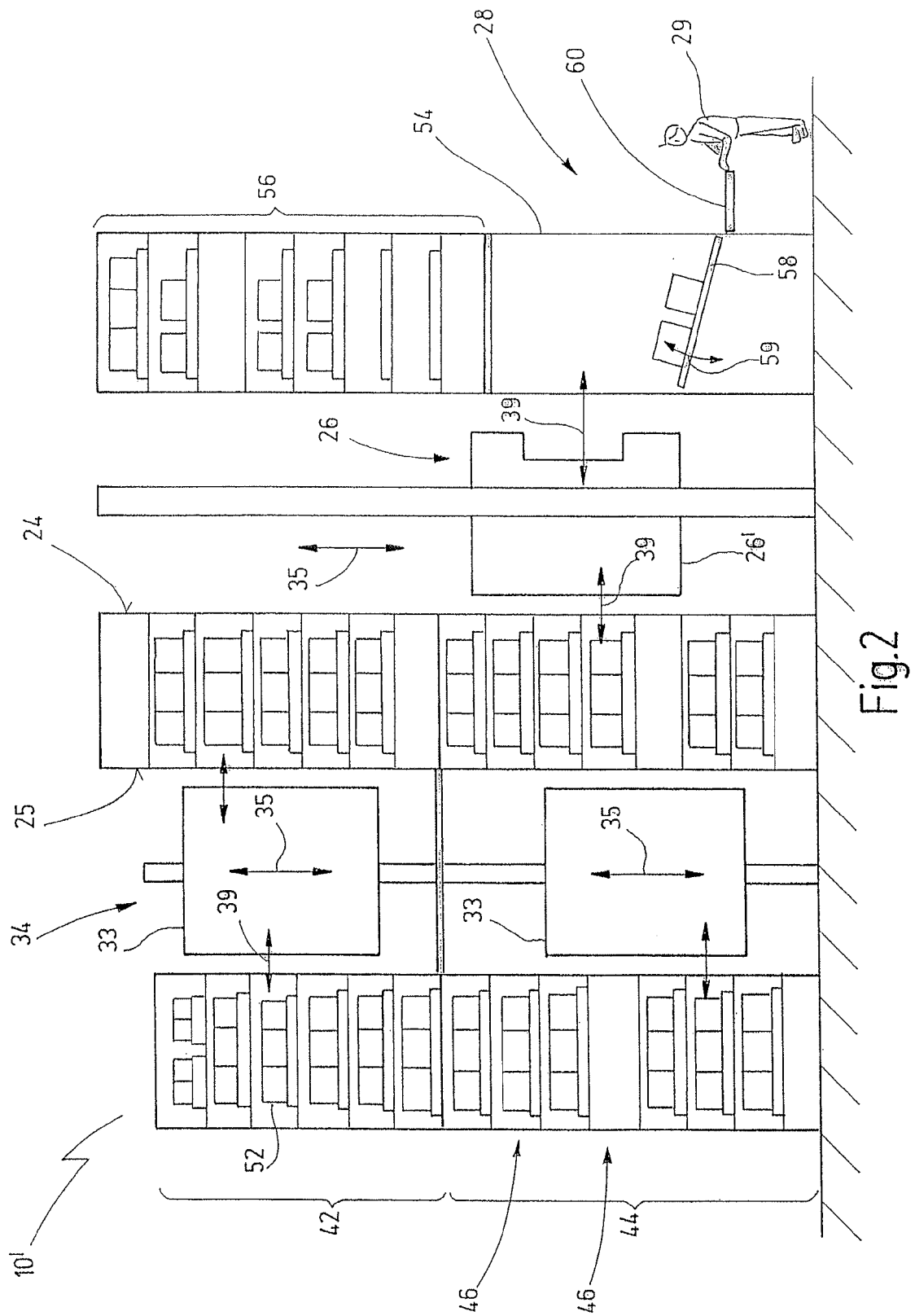
FIG. 2 shows a sectional view of a front face of a rack warehouse in accordance with the invention.

With reference to FIG. 2 a schematic view of a front face of another rack warehouse 10' in accordance with the present invention is shown.

In the left half of FIG. 2 two racks are illustrated each being separated into two rack planes 42 and 44. An RF 33 is arranged between the racks for each rack plane, the RF 33 being movable in both the horizontal (i.e. perpendicular to the drawing plane) and also in the vertical direction within a rack aisle 34. The rack planes 42 and 44 are formed by a plurality of rack rows 46, preferably by six or eight rack rows 46. Preferably, trays 52 are stored in the rack rows 46, the trays, in turn, including pallet layers, and particularly complete pallet layers. A lift unit 26 is arranged on the second longitudinal side 24. Here, the lift 26 comprises two lifts 26' (second lift 26' is not shown), which can travel in the vertical direction 35, which stand adjacent in the horizontal direction 39 and which respectively have at least one LSD by means of which load supports 52 such as a tray can be retrieved or delivered in a transversal direction. The lifts 26' convey substantially in the vertical direction 35. The RF 33, however, can also travel in the vertical direction 35 within their rack plane in order to allow reaching of all rack rows 46 in their rack planes 42, 44.

In the right half of FIG. 2 again a work station 28 is shown at which, here, an order picker 29 works. The work station 28 can be formed with a frame 54 of the rack type. A device 58, 58' or 58" for presenting the load supports is respectively provided at the lateral edges of the work area 28 (as seen in the order picker's perspective). Between these devices 58 and the order picker 29 a conveyor technique 60 such as a belt conveyor can be provided for conveying articles stored on the load supports or articles on the load supports directly to a packing station which is here not depicted. The device 58 can particularly be tilted towards the order picker (cf. arrow 59). The work station 28 can further comprise an operator guidance (pick-by-light, pick-by-voice, optical display and lights) for indicating the next action to be carried out by the order picker 29 (number, which lift, etc.). In this manner, the order-picking process can be controlled safely. There are less order-picking errors.

Further, a mechanism (not shown) can be integrated into the frame 54 (e.g. manually operated brake or pusher) by means of which the articles/load supports can be moved towards the order picker. This increases the ergonomics since the order picker does not have to stretch in order to grab articles which are located farther away.

Preferably, light grids can also be provided at suitable locations. Thus, the order-picking process can be monitored (operational safety, order-picking confirmation, etc.).

Additional storage positions 56 (parking space) of the rack type can be provided above the work station 28.

Hereinafter, an order-picking process will be described by utilizing the rack warehouse 10' of FIG. 2.

A warehouse management computer, which is not depicted in the drawings, generates a sequence of commands for each order-picking order by which all elements of an order-picking system, particularly of the rack warehouse 10', are controlled for processing all articles belonging to the order-picking order. As soon as the rack position of an article to be picked is determined, the RF 33 of the corresponding rack plane will travel along the rack in the horizontal direction 37 and, if necessary, simultaneously in the vertical direction 35, in order to position the LSD of the RF 33 directly in front of the corresponding rack position. Subsequently, a load support then is retrieved from the corresponding rack position by the aid of the LSD of the RF 33. For that purpose, the LSD preferably comprises a grabbing mechanism which engages at the front side of the load suspension device, lifts the same a little bit and pulls out the same (manipulation).

Then, the RF 33 travels to the transfer rack positions 50 (compare FIG. 1A) in order to deliver and, respectively, "store" the retrieved load support at a corresponding transfer rack position 50. A corresponding lift 26' then retrieves this load support from the corresponding transfer rack position by letting the LSD of the lift 26 grab, for example, beneath the load support and pull it into the area of the lift 26. Then, the lift 26' is driven in the vertical direction 35 to the work station 28. Upon arrival at the work station 28 the LSD of the lift 26' delivers the load support to the device 58 for presenting the load support in transversal (horizontal) direction (perpendicular to the longitudinal side 24 of the rack). The device 58 for presenting the load support preferably has a device 59 for tilting the load support. The device 58 for presenting the load support can then be tilted towards the order picker 29 such that the order picker can pull articles located on the load support or the load support as such, easily onto the conveyor belt 60. However, tilting is not necessarily required. Depending on whether the articles are stored single deep, double deep or triple deep, optionally the work station 28 can be provided with a mechanism (not depicted) by which articles, which are located spatially very far away from the order picker 29, can be moved towards the order picker 29. The order picker does not need to stretch which would be ergonomically unfavorable. Such a mechanism could, for example, also be implemented by a rake-like element which is mounted pivotally in an upper region of the work station 28, wherein a corresponding actuating handle is arrange in the region of the order picker 29.

If, for example, a so-called fast mover is to be picked, the usage of the RF 33 is not necessarily required, provided that the fast movers are stored on load supports in the area of the additional storage positions 56. In this instance, only the corresponding lift 26 is moved to the corresponding additional storage position 56, i.e. is driven thereto in the vertical direction 35. Subsequently, the load support is retrieved from the corresponding additional storage position and delivered to the device 58 for presenting the load support at the work station 28 so that the order picker 29 is supplied faster with the corresponding article. In this context it is to be noted that the RF 33 does not have to be moved at all, resulting in a significant saving of time.

Additionally it is to be noted that with this type of order-picking the RF 33 in the rack aisles 34 are decoupled from the vertical lift units 26 since the lift is arranged laterally with respect to the racks. In contrast to the approaches proposed in the prior art, where the vertical lifts are arranged in the front area of the racks, in accordance with the present invention several vertical lifts can be arranged side-by-side along the longitudinal side of the racks. Thereby, on the one hand the number of available transfer rack positions (buffer) increases. On the other hand, there is a decoupling between the rack feeder substantially conducting the horizontal movement within the rack aisle and the lift conducting the vertical movement.

This concept is particularly valuable with the storing of goods or load supports into the rack.

Preferably, in this case another lift unit is provided which is merely provided for storing the load supports into the racks. Whenever an RF 33 passes a corresponding storage transfer rack position, it takes a corresponding load support to be stored to a storage rack position or to a lift which is determined to retrieve. According to the prior art the storing, in turn, only happens by means of the vertical lifts at the front faces which had resulted in significant delays and complications when storing articles into the racks.

Figure 3:
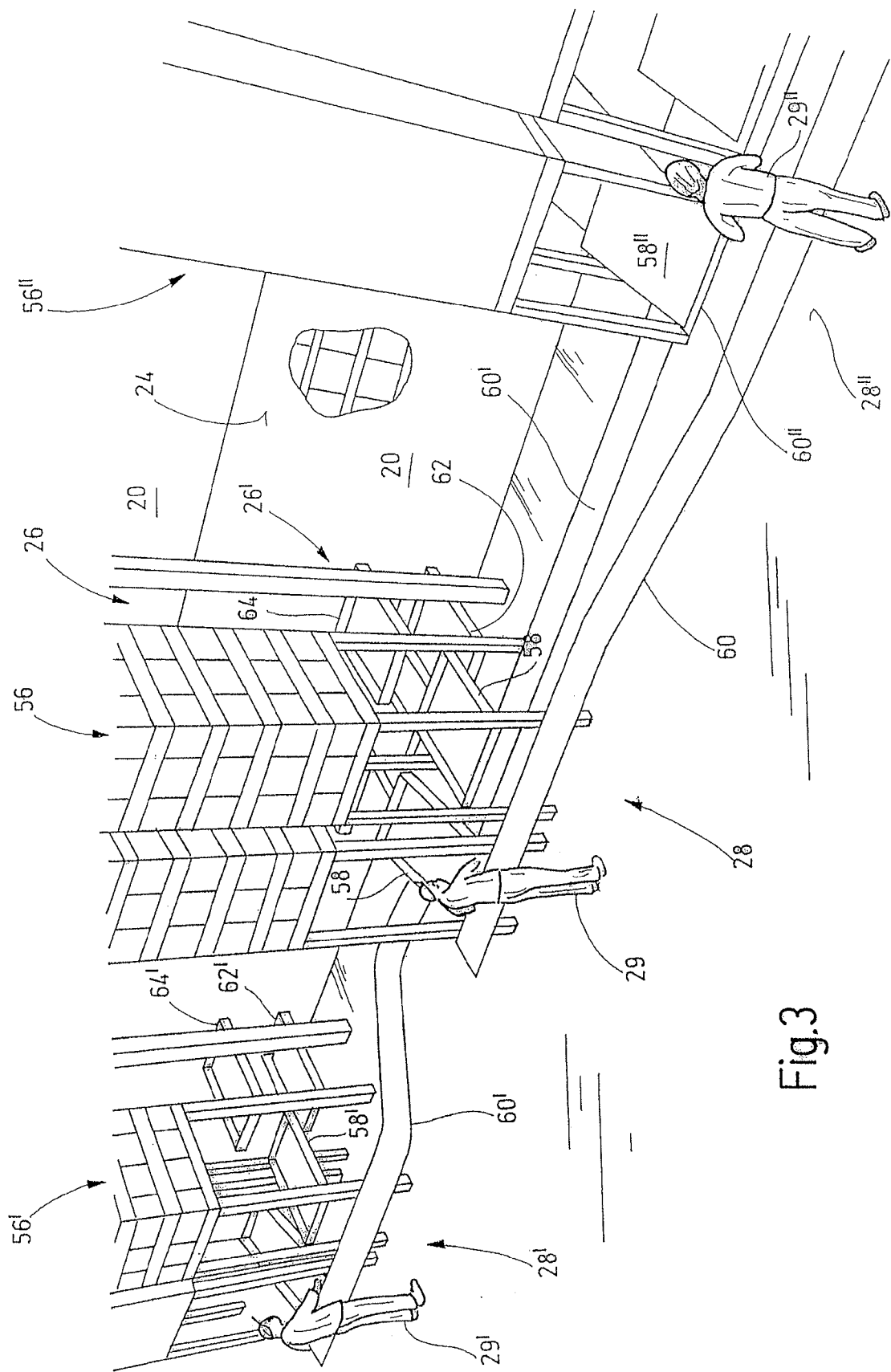
FIG. 3 shows a perspective view of work stations.

With reference to FIG. 3 several work stations 28, 28' and 28" are schematically illustrated.

The parallel arrangement of several work stations along the longitudinal side 24 of a rack 20 has great advantages with respect to storing and retrieving of articles, which are to be picked, into or from the rack warehouse. Several parallel work stations (including lift units) also increase the number of sequencing possibilities (stages) since goods, for example, can be retrieved simultaneously from the shelf to several work stations, in order to be subsequently reunited ("parallel order-picking").

For that purpose, it is necessary that each work station 28, 28' and 28" preferably has its own conveyor technique 60, 60' and 60", respectively. Preferably, each lift 26' of the lift unit 26 comprises at least two LSD 62 and 64, 62' and 64', as well as 62" and 64" (not shown), respectively. In this manner, the number of exchange cycles between the storage rack and the lift can be increased.

The LSD 62 or 64 of the first work station 28 delivers load supports (not shown here) to the device 58 for presenting the load supports. This device 58 is tilted towards the order picker 29 so that he/she can rehandle easily entire load supports, or only articles located on the load supports onto the conveyor belt 60.

Since the lift units 26 of FIG. 3 respectively have lifts 26, which are controllable independently from each other, the work station 28 can be supplied with load supports or articles, which are to be picked, almost in a permanent manner. While one of the lifts, for example, retrieves a load support from a transfer position, the other lift delivers to the device 58 a load support already retrieved.

By the aid of the conveyor techniques 60, 60' and 60", each of which is preferably implemented by a plurality of conveyor belts being arranged consecutively, one single order-picking order can be synchronized, the order-picking order being processed simultaneously, i.e. parallelly, at several work stations. This means that conveyor belts with short distances to the packing station can be operated "slowlier" in comparison with conveyor belts having longer ways. "Slowlier" means, for example, that articles located on the conveyor belt can be accumulated longer or stopped longer.

Figure 4:
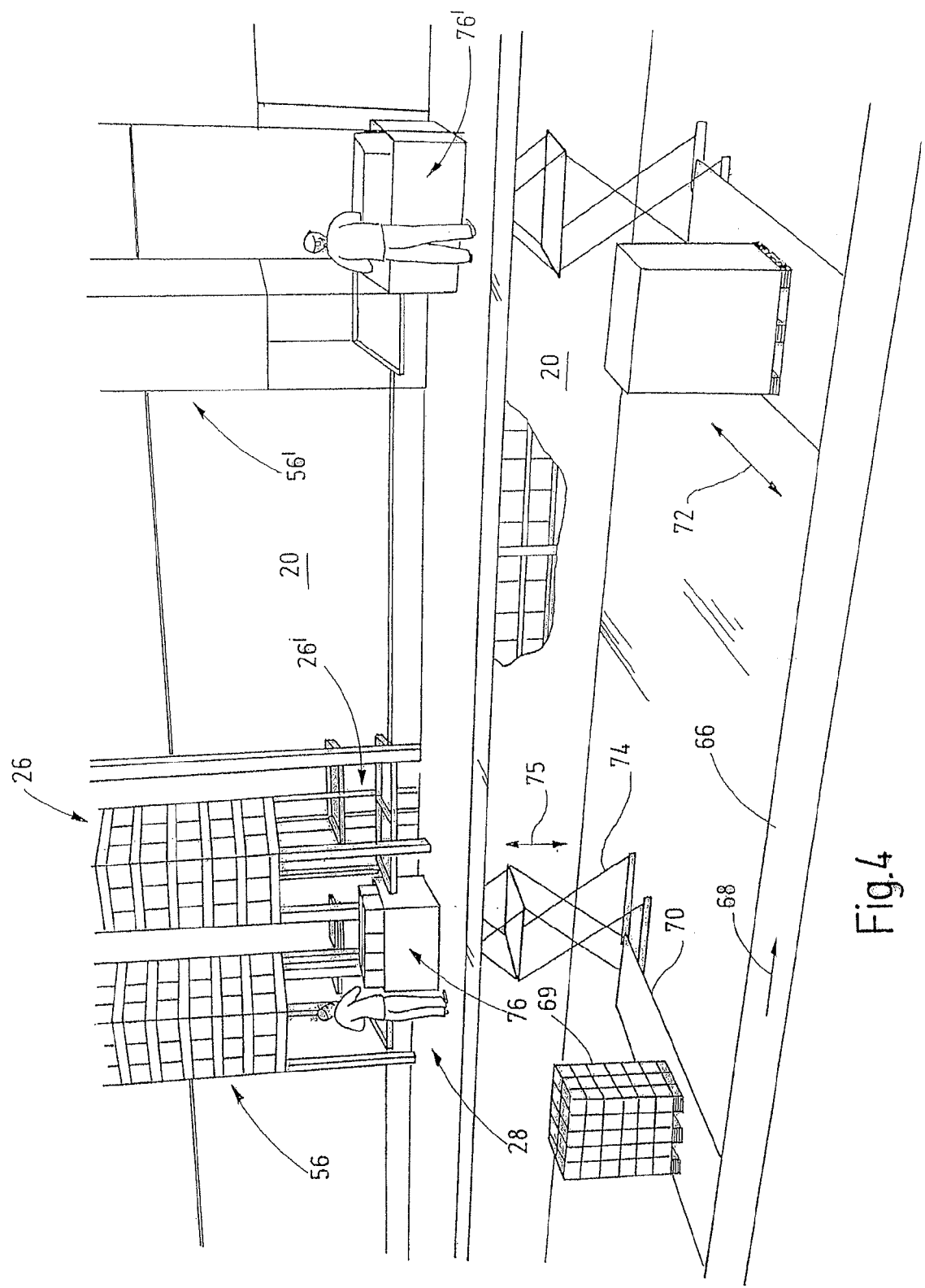
FIG. 4 shows a perspective view of a work station having an integrated packing station.

FIG. 4 shows a work station 28 which is slightly changed in comparison to FIG. 3.

At the work station 28 of FIG. 4, the articles are not rehandled onto a conveyor technique 60 (cf. FIG. 3), but are packed directly, for example, onto a pallet. A work station formed like that is described in more detail in the German patent application entitled "rack integrated packing station and order-picking method" which was filed by the applicant of the present invention on the same day as the present application at the German Patent and Trademark Office. The content of this application is integrated here by reference.

The work station 28 of FIG. 4 is arranged here in the area of a second rack plane 42, i.e. one rack plane above ground. In the area of a lower most rack plane 44 a conveyor technique 66 is provided which conveys in a main conveyance direction 68. Connecting conveyor techniques 70 are coupled to the conveyor technique 66, wherein the connection conveyor techniques can transport completely packed Europool pallets 69 from or to the (main) conveyor track 66. The conveyor track 66 thus serves not only for transporting completely loaded pallets 69, but can also be used for delivering empty pallets (not shown). Therefore, the conveyor track 70 can be operated in both directions as it is indicated by a double arrow 72.

A lifting device 74 abuts to the end of the conveyor technique 70, oppositely to the main conveyor track 66, the lifting device being actuatable in a lifting direction 75, as indicated by a double arrow. By the aid of the lifting device 74 empty pallets are lifted to the level of the work station 28. In the area of the work station 28 preferably a stacking frame 76 or 76' is provided. The stacking frame 76 serves for facilitating a packing process. The articles to be picked are delivered to the work station 28 and the order picker 29 via the lifts 26'. Subsequently, the articles are preferably tilted by the device 58 towards the work station. Preferably, the devices 58 for presenting the load support tilt towards the stacking aid 76 which is realized in FIG. 4 in terms of a rectangular frame. Tilting towards the stacking aid 76 is ergonomically favorable, and thus facilitates the packing process.

As soon as the order picker 29 has stacked a pallet layer within the frame 76, the lifting device 74 is lowered a predetermined height which approximately corresponds to a height of the stacked layer. This can be detected by means of a light grid installed at a suitable location. This lowering can be initiated in an automated manner, but also manually by the order picker 29. For preventing that layers of goods, which are already stacked and lowered, get out of place, or in worst case even slip from the pallet, preferably beneath the stacking aid 76 a wrapping machine (not shown) is provided, which encloses the stack circumferentially, for example, with a film while the wrapping machine travels around the stack.

Empty pallets optionally can be stored into the additional storage positions 56 as well. In this manner a warehouse dedicated to empty pallets as well as a conveyor technique for transporting the empty pallets to the work stations 28 can be saved.

Figure 5:
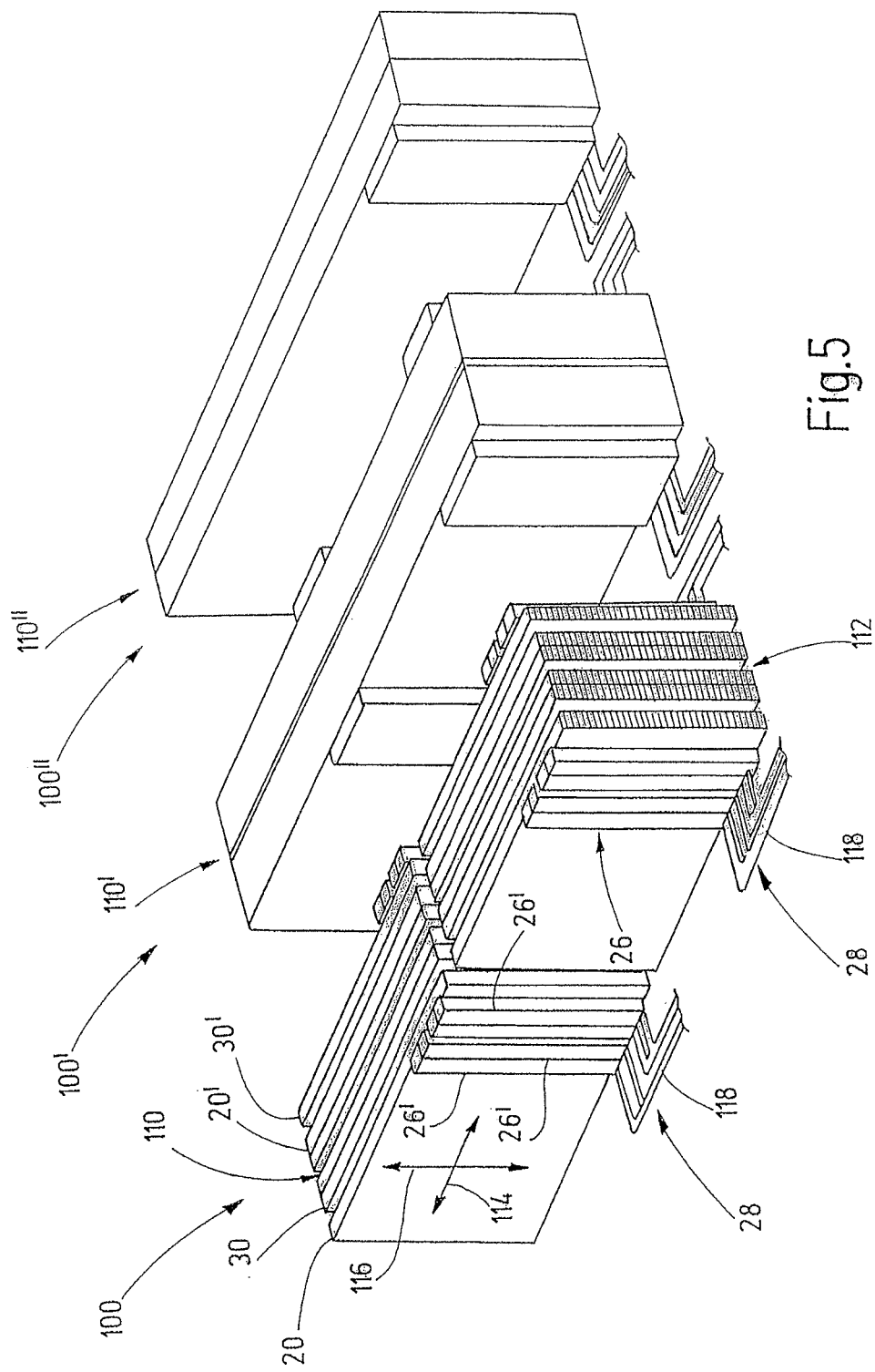
FIG. 5 shows a perspective view of several rack units.

With reference to FIG. 5 several rack units 100, 100', 100" are shown, each of which is combined with a so-called automatic small parts warehouse ("ASPW").

In a ASPW, which can be controlled in a fully automated manner, work is done according to the principle "goods-to-man". Entire storage units full of small parts can be controlled via electronic data processing in a mechanical manner. Unmanned automated rack servicing units (RSU) pick the goods from a storage position and provide the same to an order-picking station or a conveyor track connection. The used RSUs are equipped with units of underriding technique, pulling technique or grabbing technique, as required.

Such an ASPW can be integrated into a rack warehouse or a rack unit in accordance with the present invention. In FIG. 5 three of these combinations, ASPW 110, 110', and 110", are shown. The ASPW 110, comprising two adjacent racks, is, in this connection, arranged centrally relative to two rack units respectively being formed by racks 20, 30 or 20', 30'. Further, in FIG. 5, respectively two rack units are arranged consecutively. The ASPW 100 here is respectively assigned to a rack unit. However, it is also possible to use one continuous ASPW (not shown) for two rack units which are arranged (in the longitudinal direction) consecutively. In this case, four rack units were supplied by a single ASPW.

The ASPW 110 is arranged centrally in this sandwich arrangement of FIG. 5, and serves for supplying the racks 20, 30 or 20', 30' with load supports. The load supports are stored by at least one RSU 112. The RSU 112 can travel in an aisle along the entire length as well as the entire height in horizontal direction 114 and vertical direction 116, respectively. For that purpose, the RSU 112 is equipped with a vehicle chassis (not shown) to which a mast having a lifting unit including a LSD. The LSD preferably is a device having a telescope characteristic for allowing the load supports to be transferred from the racks of the ASPW 110 into the adjacent racks 30 or 20' of the laterally arranged rack units. Alternatively, conveyor techniques for transferring the load supports to the racks 20, 30 can be used.

At the outer longitudinal sides of the rack units, in turn, lift units 26 for retrieving load supports are provided. Apart from that manner, by which load supports are stored into the racks, the racks shown in FIG. 5 do not distinguish from the embodiments explained above. In the example of FIG. 5 the lift units 26 are connected to a goods issue conveyor 118 at the work station 28 for conveying the goods and/or load supports to order-picking stations (not shown here).

Figure 6:
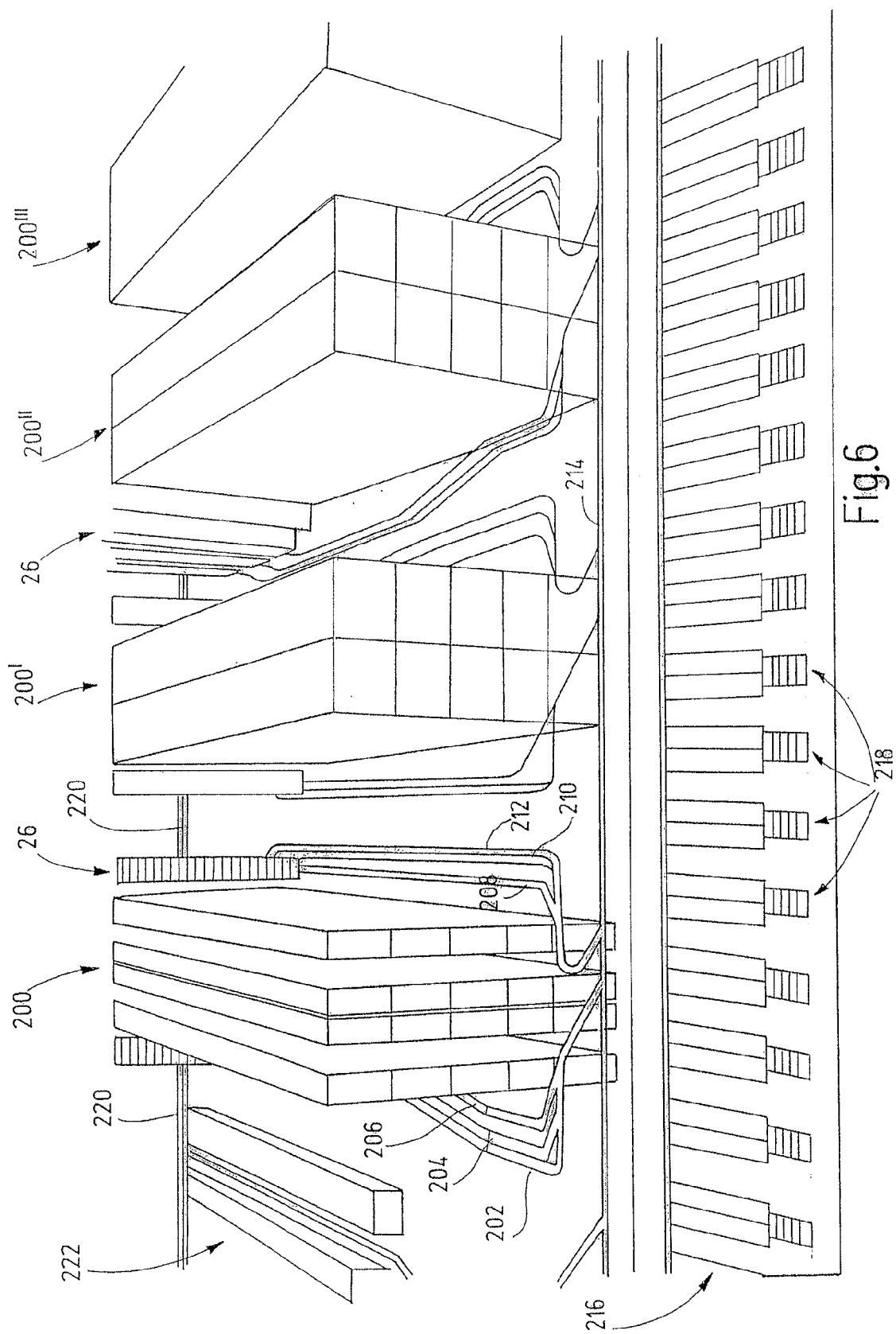
FIG. 6 shows a perspective view of an order-picking system.

In FIG. 6 another embodiment of a rack warehouse according to the present invention is illustrated.

In total, four rack warehouses 200, 200', 200" and 200'" are shown. The rack warehouses 200, 200', 200" and 200'" are constructed identically. That is why only the rack warehouse 200 hereinafter is explained in more detail.

At the storage rack 200 two rack units, each of which is formed of two racks having rack aisles arranged therebetween, are arranged directly side-by-side. In the rack aisles of the individual planes, wherein in FIG. 6 respectively five planes are depicted, RFs (not depicted here) travel as explained above.

Further, FIG. 6 shows several lateral lift units 26. In this connection, some of the lift units 26 can serve for storing purposes and others for retrieving the goods. Goods to be retrieved are retrieved by means of conveyor techniques 202-212 extending along the longitudinal side of the rack warehouse, and can be conveyed via a collecting conveyor technique 214 to the packing area 216 having a plurality of packing stations 218.

A separate conveyor technique 220 can be provided dedicated to the goods issue of the rack warehouse. Additionally, a fast-moving item area 222 can be provided. In this fast-moving item area goods or articles on pallets are stored which occur in bigger frequencies in the order-picking orders so that storing into the rack warehouse 200 economically would not make sense. Goods of the fast-moving item area 222 can be conveyed through another separate conveyor technique to the main conveyor technique 214 towards the packing area 216.

Figure 7:
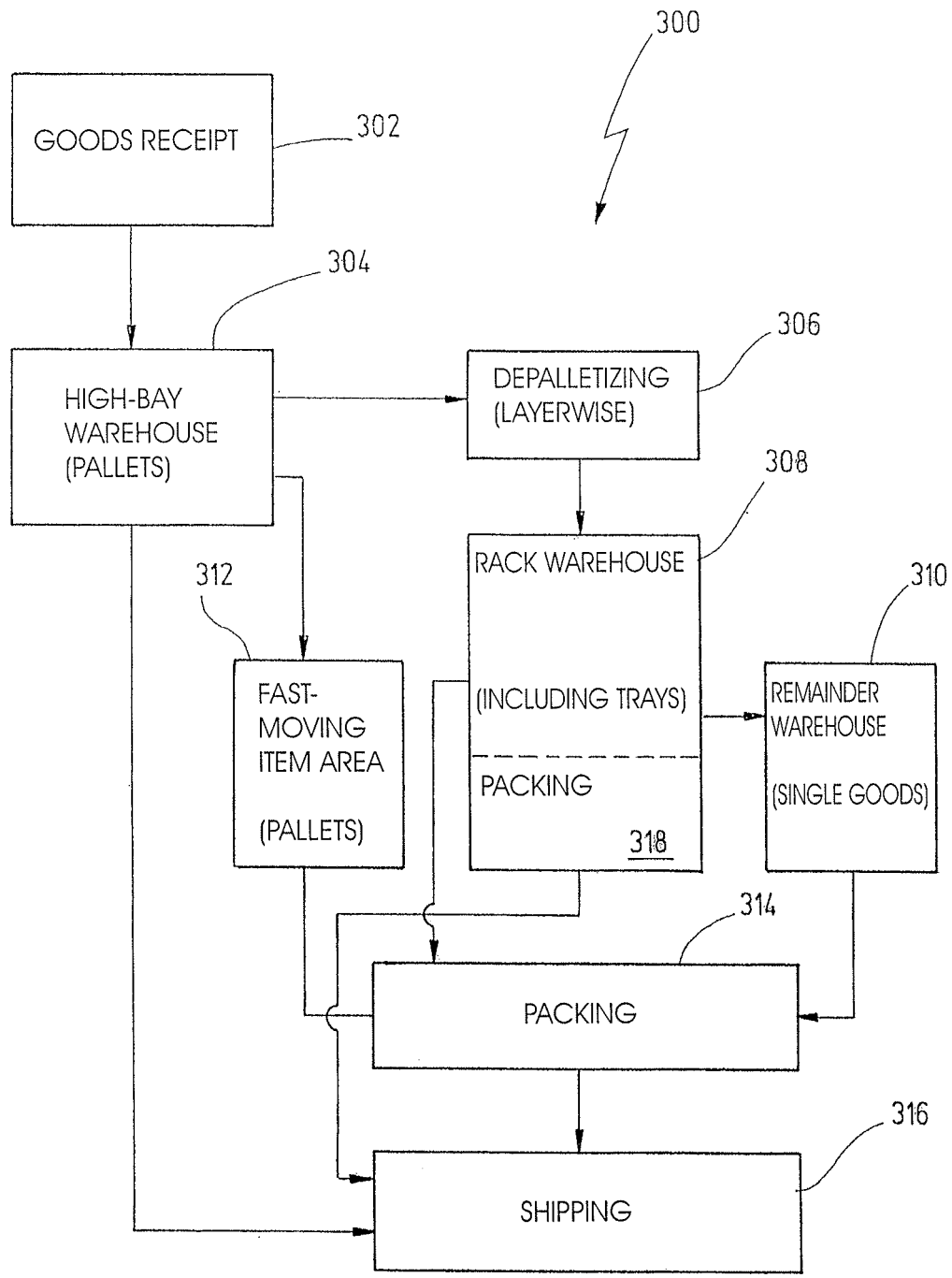
FIG. 7 shows a schematic block diagram of another order-picking system.

In FIG. 7 an order-picking system 300 is shown which uses the rack warehouse in accordance with the present invention.

Goods receipt happens in block 302. Here, usually goods are delivered, for example by vans for allowing subsequent storage in a high-bay warehouse 304.

In accordance with a preferred embodiment of the invention pallets of the high-bay warehouse 304 are depalletized, in dependence on an order-picking order, by means of a depalletizer 306 (automated and/or manually), particularly in a layerwise manner, onto trays. It is clear that depalletizing can also happen individually and/or into containers. After the depalletizing, the trays which are loaded in a layerwise manner are stored into a rack warehouse 308. The rack warehouse 308, in this connection, is formed as explained above with reference to several embodiments in accordance with the present invention.

The method of operating a rack warehouse, which is (exclusively) equipped with trays (load supports) which, in turn, are respectively loaded with one pallet layer of packing units (articles) is intensively described in the German patent application entitled "Method for operating an order-picking system" which was filed by the applicant of the present application on the same date with the German Patent and Trademark Office as the present application. The content of the application "Method for operating an order-picking system" is integrated here by reference.

Articles which are needed for the order-picking more frequently can optionally be transported into a fast-moving item area 312 (cf. FIG. 6, fast-moving item area 222), stored on an interim basis, and order picked there.

The goods which are stored in the rack warehouse 308 preferably on trays are retrieved in accordance with an order-picking order and conveyed to a packing station 314. Articles which are not needed from a tray, which is loaded in a layerwise manner, for the processing of an order-picking order can be conveyed into a remainder warehouse 310 in the form of single article on trays dedicated for single articles. This single goods can later be used with the processing of order-picking order for "filling" lacking articles in the packing station 314.

In the packing area 314 which can be formed by a plurality of packing stations, the articles or goods to be picked are stacked or packed, for example, onto pallets. If a pallet is completely packed, it is conveyed into a shipping area 316 for being shipped.

A packing station separately arranged relative to the rack is described in detail in the German patent application entitled "Separate packing station", which was filed by the applicant of the present application with the German Patent and Trademark Office on the same day as the present application. The content of the application "Separate packing station" is integrated hereinto by reference.

Also, the packing process can optionally happen directly within the area of the rack warehouse 308, as indicated by an area 318 in the rack warehouse 308 (cf. also FIG. 4).

Figure 8:
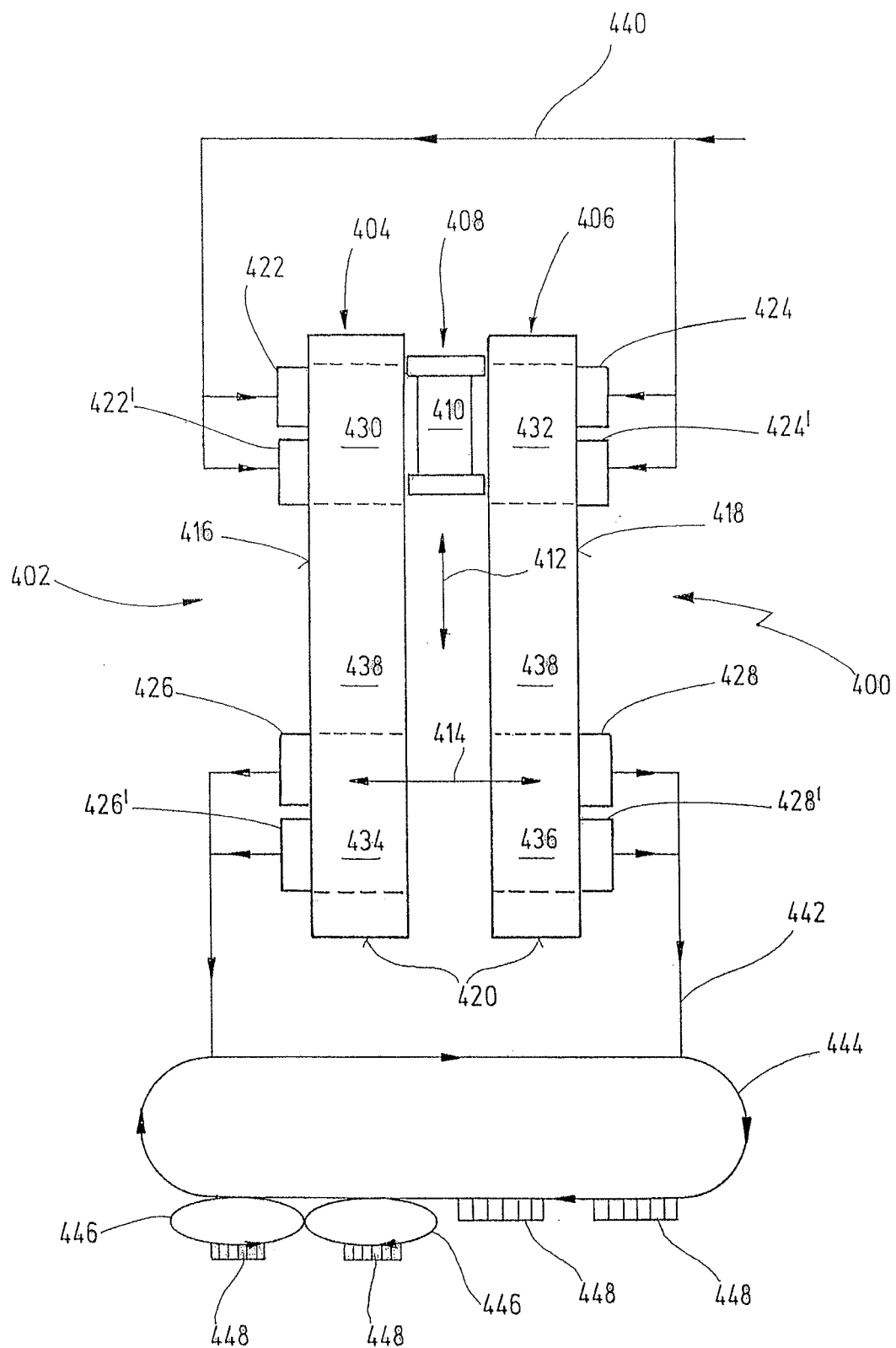
FIG. 8 shows a top view of another order-picking system for illustrating goods receipt and goods issue.

In FIG. 8 another embodiment of an order-picking system 400 in accordance with the present invention is shown.

The order-picking system 400 comprises a rack warehouse 402 which includes a first rack 404 and a second rack 406 defining a rack aisle 408 therebetween. In the rack aisle 408 an RF 410 can travel in a horizontal direction 412. It is clear that the RF 410 can also travel in a vertical direction (i.e. perpendicular to the drawing plane) for being able to reach rack rows (not shown here) in different heights.

Direction of storage and retrieval is indicated by an arrow 414. The RF 410 moves load supports substantially in the direction of the arrow 412.

An exterior longitudinal side of the first rack 404 is designated by 416. An exterior longitudinal side of the second rack 406 is designated by 418. Front faces of the first rack 404 and the second rack 406 are designated by 420.

The first rack 404 comprises a first pair of lifts 422, 422' which serves for storing goods. The second rack 406 comprises a second pair of lifts 424, 424' which also serves for storing goods. Further, a third pair of lifts 426, 426' and a forth pair of lifts 428, 428' are provided which are used for retrieving goods to be picked.

In the racks 404 and 406, in turn, the corresponding transfer areas 430-436 are indicated with broken lines. "Normal" rack positions 438 are also provided.

The first pair of lifts 422, 422' and the second pair of lifts 424, 424' are connected with a conveyor technique 440 for the goods receipt. As can be taken from FIG. 8, the conveyor technique 440 for the goods receipt branches such that each lift of the first and second pairs of lifts is connected with its own conveyor branch for storing goods. This represents a sequencing stage for the order-picking process. Dependent on which lift of the first and second pairs of lifts is given an article or a load support, for example, storage happens into the left or right rack 404 or 406. The selection of the rack block (cf. FIG. 6) represents another sequencing stage.

Another sequencing stage is realized by the lifts 422, 422', 424 and 424'. Goods are transported in the vertical direction by the lifts into the different rack planes which are not depicted in FIG. 8. Assuming that the conveyor technique 440 for the goods receipt is located on ground level, based on the storing height (rack plane) it can be controlled which way the goods to be picked have to cover throughout the order-picking system 400 (in the height direction). The higher the rack plane is, into which it is to be stored, the longer the way is. Hence, an ABC distribution can be implemented in the vertical direction. "A", "B" and "C" articles are different in the frequency of their occurrences in order-picking orders. "A" articles are very often needed, "C" articles the fewest.

Another sequencing stage is represented by the RF 410. The RF 410 can store—in the horizontal direction—load supports closer or farther away relative to the lifts 426, 426', 428 and 428' which serve for the retrieval of the load supports. Also, here an ABC distribution can be realized.

The lifts 426-428' of the third and fourth pairs of lifts again can be connected to a conveyor technique 442 for retrieving goods to be picked. Preferably, the conveyor technique 442 itself is divided into a plurality of partial conveyance pieces, or connected to a sorting conveyor technique 444, which is either connected to another sorting loop 446 (conveyor technique) or directly to the order-picking stations 448.

Still another sequencing possibility is available by dividing the articles in the vertical direction within the same rack plane.

The selection of a lift of the third and fourth pairs of lifts represents a sequencing stage. Another sequencing stage is realized by the selection of the order-picking station 448.

The order-picking system shown in FIG. 8 has the advantage that the goods receipt is decoupled from the goods issue. Additionally, the RF 410 is decoupled from the lifts. If the goods issue is compared with the goods receipt with regard to its respective statistical frequency distributed over the day, it is to be noted that the goods receipt typically has three peaks. These peaks are temporarily located in an area around 7 o'clock, 12 o'clock and 18 o'clock when goods are usually delivered. The goods issue increases from 7 o'clock steadily and stays from about 11 o'clock to about 18 o'clock on a relatively constant level, in order to decrease again to zero until 20 o'clock. If one and the same lifts are used for storing and retrieving, as it is usually done in the prior art, these lifts are not able to handle this double load which occurs if goods receipt peaks occur. The rack warehouse proposed here, however, can handle this. In accordance with the present invention, however, a transfer stock can be directly converted into the available stock.

It is clear that in the rack warehouse according to the present invention not only trays or only containers can be stored. Rather different load supports can be used commonly, i.e. simultaneously. Preferably, the rack planes are then divided in accordance with types of load supports. For example, substantially containers can be stored in a rack plane while substantially trays would be stored in another plane.

Further, up to now most times two lifts were used at a work station. It is clear that several work stations can be arranged directly side-by-side, which again are supplied by several lifts. Even further, the work stations can be arranged in aisles between rack units, as it is exemplarily shown in FIG. 5. If order picking or packing is done directly at the work station, for example into a pallet, several order pickers could pack onto the same pallet, whereby the packing station integrated into the rack warehouse (cf. FIG. 4) is spatially arranged between two rack warehouses (cf. FIG. 5).

The invention is further characterized by being modular and scalable. In this context, modular means that almost all elements of the invention can be operated manually or automated. Scalable means that the order-picking system according to the present invention, or the tray warehouse according to the present invention, can be designed arbitrarily in dependence on efficiency and dimensioning, wherein the general concept is always maintained. Further, it is clear that the concept described above can also be rotated by 90°. This means that the lifts could take over the function of the rack feeder, and conversely that the rack feeders can take over the function of the lifts. Rack planes then were formed by column-like areas. Rack rows were realized by rack columns having rack positions arranged on top of each other.

The lifts of a lift unit can be used separately for storing and retrieving so that the provision of two lift units is not required for separating the storing flows.

Alternatively, however, it is possible to use a lift for both the storing and the retrieving. In this instance it is advantageous, if several lifts are provided in order to achieve a satisfying efficiency.

Further, a conveyor technique can be arranged, for example, on top of a rack block particularly forming a loop above the two neighbouring racks. This additional conveyor technique is preferably connected with the conveyor technique responsible for the goods receipt into the rack. In this manner, lifts can be used, as mentioned above, for both the storing and the retrieving. The goods issue then happens, for example, at the bottom of the lift where an additional conveyor technique is arranged being responsible for the goods issue of the rack. Additionally, load supports of one of the racks can be exchanged with the other rack by means of a conveyor technique loop. The transport of empty load supports can also be done by this conveyor technique. The loop represents another sequencing possibility.

Another advantage of the rack warehouse in accordance with the present invention is to be seen in the opportunity of a stagewise expansion. If it happens that the warehouse has to be expanded, for example more parking positions (rack positions) are required, thus the rack is simply lengthened. Additional lateral lifts are provided so that the performance is maintained or can even be increased. For that purpose, new aisles had to be built in the prior art.

More lifts also increase failure safety. If one of the lateral lifts fails, then the rack is not disused. If one of the lifts located at the front side according to the prior art fails the associated aisle (respectively both of the racks) cannot be used anymore.

Further, it is pointed out that the shipping loads also can be provided with a label at the work stations, particularly at the packing stations. Additionally, layers can be built, one can work with filling material, one can weigh, shipping papers can be established and transport securing can be done there.

Therefore, I claim:

1. A rack warehouse for automatically order-picking goods stored in load supports, comprising:

at least one rack having first and second longitudinal sides and two front faces, wherein the rack comprises at least one rack plane, wherein each rack plane comprises a plurality of rack rows, wherein the rack rows are arranged on top of each other and respectively include a plurality of rack positions arranged in horizontal rows, wherein the rack positions comprise rack storage positions and transfer rack positions;

at least one rack feeder for each rack plane, each rack feeder comprising at least one rack-feeder load suspension device for storing and retrieving load supports into and from the rack positions, wherein the rack feeder can travel in horizontal and vertical directions along the first longitudinal side of the rack, in order to store and retrieve load supports into and from the at least one rack plane; and several vertical-lift units horizontally fixed along and arranged at the second longitudinal side of the rack and each of which comprises a vertical-lift unit load suspension device for retrieving and delivering load supports from and to the transfer rack positions adjacent to each of the several vertical-lift units wherein each of the vertical lift units comprises at least one of a plurality of lifts, and each one of the transfer rack positions, within each of the rack rows, lies oppositely to a corresponding one of the lifts that is driven in the vertical direction with respect to the one of the transfer rack positions;

wherein a temporary storage of load supports in the transfer rack positions decouples transfers between the rack feeders and the vertical lift units.

2. The rack warehouse of claim 1, wherein the load supports are trays.

3. The rack warehouse of claim 1, further comprising:
at least one work station.

4. The rack warehouse of claim 3, wherein at least one of the vertical-lift units is assigned to each work station, and each work station comprises a device for presenting load supports.

5. The rack warehouse of claim 4, wherein the device for presenting load supports includes an area onto which or from which the load support is delivered or retrieved by means of the vertical-lift units.

6. The rack warehouse of claim 5, wherein the area of the device for presenting load support is coupled to a device for tilting the area.

7. The rack warehouse of claim 3, wherein first and second vertical-lift units are provided, wherein first transfer rack positions are assigned to the first vertical-lift unit and wherein the first vertical-lift unit is adapted to retrieve load supports from the rack and transport the same to the at least one work station, and wherein second transfer rack positions are assigned to the second vertical-lift unit and wherein the second vertical-lift unit is adapted to deliver the load supports to the rack.

8. The rack warehouse of claim 7, wherein the second vertical-lift unit is coupled to a goods receipt conveyor.

9. The rack warehouse of claim 3, wherein each of the vertical-lift units comprises a number of vertical-lift unit load suspension devices, each of which can travel individually or in pairs along a frame.

10. The rack warehouse of claim 9, wherein the frame is arranged such that the vertical-lift units laterally supply the at least one work station with the load supports.

11. The rack warehouse of claim 3, wherein the at least one work station is coupled to a goods issue conveyor track.

12. The rack warehouse of claim 3, wherein the at least one work station further includes a rehandling unit, wherein the rehandling unit rehandles goods for future processing, which are contained on or in a load support to be presented.

13. The rack warehouse of claim 12, wherein the rehandling unit is an operator, or a rehandling machine.

14. The rack warehouse of claim 3, wherein the at least one work station has a frame of a rack type, wherein the frame comprises additional rack positions, which are arranged on top of each other, for storing fast-mover load supports, wherein these additional rack positions are arranged at least one of above and beneath the device for presenting load supports, which can be integrated into the frame such that one of the vertical-lift units, being assigned to the at least one work station, can deliver and retrieve the fast-mover load supports.

15. The rack warehouse of claim 1, wherein a first rack and a second rack are provided, which are arranged along the first longitudinal side in an opposite manner, form a first rack unit and respectively define a rack aisle in a longitudinal direction therebetween, wherein the rack feeders of each of the rack planes can travel in the rack aisle.

16. The rack warehouse of claim 15, wherein the vertical-lift units are respectively arranged at exterior longitudinal sides of the rack unit.

17. The rack warehouse of claim 1, wherein the load support is a tray on which goods of one sort only are stored in terms of complete pallet layers.

18. The rack warehouse of claim 17, wherein the rack-feeder load suspension device can carry up to four load supports simultaneously and control the up to four load supports independently from each other, and the vertical-lift unit load suspension device can carry several load supports at least one stacked and side-by-side, and control the several load supports independently from each other.

19. The rack warehouse of claim 1, wherein the transfer rack positions include first transfer rack positions which are supplied with load supports during an order-picking process from the first longitudinal side of the rack by means of the rack feeder, and emptied from the second longitudinal side of the rack by means of one of the vertical-lift units, and which are supplied during a storing process from the second longitudinal side and emptied from the first longitudinal side.

20. The rack warehouse of claim 1, wherein each rack plane comprises up to eight rack rows.

21. A rack warehouse system for automatically order-picking goods stored in load supports, comprising:

at least one rack having first and second longitudinal sides and two front faces, wherein the rack comprises at least one rack plane, wherein each rack plane comprises a plurality of rack rows, wherein the rack rows are arranged on top of each other and respectively include a plurality of rack positions arranged in horizontal rows, wherein the rack positions comprise rack storage positions and transfer rack positions;

at least one rack feeder for each rack plane, each of the rack feeders comprising at least one rack-feeder load suspension device for storing and retrieving load supports into and from the rack positions, wherein the rack feeder can travel in horizontal and vertical directions along the first longitudinal side of the rack, in order to store and retrieve load supports into and from the at least one rack plane;

several vertical-lift units horizontally fixed along and arranged at the second longitudinal side of the rack and each of which comprises a vertical-lift unit load suspension device that travels vertically for retrieving and delivering load supports from and to the transfer rack positions adjacent to each of the several vertical-lift units wherein each of the vertical lift units comprises at least one of a plurality of lifts, and each one of the transfer rack positions, within each of the rack rows, lies oppositely to a corresponding one of the lifts that is driven in the vertical direction with respect to the one of the transfer rack positions;

a high bay warehouse for storing loaded pallets; and a depalletizing device for depalletizing the pallets of the high bay warehouse;

wherein a temporary storage of load supports in the transfer rack positions decouples transfers between the rack feeders and the vertical lift units.

* * * * *